(12) United States Patent
Weaver et al.

(10) Patent No.: US 7,234,617 B2
(45) Date of Patent: Jun. 26, 2007

(54) SECUREMENT ARRANGEMENT FOR ELONGATE ARTICLES

(75) Inventors: Gregor Weaver, Waterbury, CT (US);
Mark Viklund, New Milford, CT (US);
Vincent Bove, Bethlehem, CT (US);
Kevin W. Harris, Middlebury, CT (US)

(73) Assignee: Thule Sweden AB, Hillerstorp (SE)

( * ) Notice: Subject to any disclaimer, the term of this patent is extended or adjusted under 35 U.S.C. 154(b) by 0 days.

(21) Appl. No.: 11/306,846

(22) Filed: Jan. 12, 2006

(65) Prior Publication Data

US 2006/0255081 A1    Nov. 16, 2006

Related U.S. Application Data

(63) Continuation of application No. 11/159,158, filed on Jun. 23, 2005, now abandoned.

(60) Provisional application No. 60/522,054, filed on Aug. 7, 2004, provisional application No. 60/582,387, filed on Jun. 23, 2004.

(51) Int. Cl.
*B60R 9/048* (2006.01)

(52) U.S. Cl. .................. 224/324; 224/315; 224/319; 224/323; 224/569; 70/58

(58) Field of Classification Search ................ 224/324, 224/315, 319, 322, 323, 563, 567, 568, 569, 224/570, 917.5, 218, 219; 70/14, 18, 58, 70/19, 49, 233; 248/503, 505, 553; 211/5, 211/7, 8; 410/97, 100
See application file for complete search history.

(56) References Cited

U.S. PATENT DOCUMENTS

| | | | | |
|---|---|---|---|---|
| 3,906,758 A | * | 9/1975 | Hurwitt | 70/30 |
| 4,118,960 A | * | 10/1978 | Lipschutz | 70/59 |
| 4,120,124 A | * | 10/1978 | Temple et al. | 52/126.4 |
| 4,174,119 A | * | 11/1979 | Biles | 410/103 |
| 4,369,009 A | * | 1/1983 | Fulford | 410/35 |
| 4,954,030 A | * | 9/1990 | Szucs et al. | 410/96 |
| 5,077,927 A | * | 1/1992 | Derryberry | 43/4 |
| 5,275,076 A | * | 1/1994 | Greenwalt | 83/698.31 |
| 5,316,192 A | * | 5/1994 | Ng | 224/324 |
| 5,423,466 A | * | 6/1995 | Moon | 224/324 |
| 5,511,894 A | * | 4/1996 | Ng | 403/320 |
| 5,638,710 A | * | 6/1997 | Howard, Jr. et al. | 70/259 |
| 5,657,913 A | * | 8/1997 | Cucheran et al. | 224/319 |
| 5,791,170 A | * | 8/1998 | Officer | 70/49 |
| 6,164,507 A | * | 12/2000 | Dean et al. | 224/324 |
| 6,446,474 B1 | * | 9/2002 | Tabacchi et al. | 70/16 |
| 6,460,708 B2 | * | 10/2002 | Dean et al. | 211/20 |
| 6,561,396 B2 | * | 5/2003 | Ketterhagen | 224/310 |
| 6,561,398 B1 | * | 5/2003 | Cole et al. | 224/324 |
| 6,766,929 B2 | * | 7/2004 | Karlsson | 224/319 |
| 2003/0192926 A1 | * | 10/2003 | Baseflug et al. | 224/258 |
| 2004/0055343 A1 | * | 3/2004 | Mahre et al. | 70/58 |

* cited by examiner

*Primary Examiner*—Nathan J. Newhouse
*Assistant Examiner*—Justin M. Larson
(74) *Attorney, Agent, or Firm*—Novak Druce & Quigg, LLP

(57) ABSTRACT

Method and apparatus for providing dual anti-theft locks protecting an elongate object stored on a load bar of a load carrier. A bracket is attached to a retainer using connecting fasteners secured by connecting knobs to firmly attach the apparatus to the load bar when the load bar lies between the bracket and the retainer. A lever extending from the retainer controls a first locking mechanism having a gripper cable for wrapping the elongate object tightly against the retainer. The lever also controls a second locking mechanism coupling the lever to at least one latch that prevents rotation of one or more connecting knobs to prevent removal of the apparatus from the load bar. A lock limits movement of the lever to prevent or allow release of the elongate object from the retainer and the apparatus from the load bar.

10 Claims, 5 Drawing Sheets

SECUREMENT ARRANGEMENT FOR ELONGATE ARTICLES

CROSS-REFERENCE TO RELATED APPLICATIONS

The present application is a continuation application of U.S. application Ser. No. 11/159,158 filed Jun. 23, 2005, now abandoned, which, claims the benefit of U.S. Provisional Application Nos. 60/522,054 filed Aug. 7, 2004 and 60/582,387 filed Jun. 23, 2004. Said applications are expressly incorporated herein by reference in their entireties.

FIELD OF THE INVENTION

The present invention relates generally to an apparatus for securing articles to a vehicle load carrier, and more specifically, to an apparatus, including a dual locking mechanism for preventing theft of both the articles secured to a vehicle load carrier using the apparatus and the apparatus itself.

BACKGROUND OF THE INVENTION

Recreational activities involving a variety of water sports typically require participants to transport required equipment therefore. Depending on the size or quantity of the articles or pieces of sports equipment to be transported, it may be necessary to use a carrier arrangement as large as a boat trailer, for example, or as small as a clamping device that may be attached to a load carrier, such as a sports equipment rack for an automobile or similar small vehicle.

Vehicle mounted sports equipment racks are known devices for carrying equipment. Suitable vehicle mounting points for sports equipment racks typically include the rear of a vehicle or the roof of a vehicle. Rear mounted racks and roof racks may be used to transport bicycles, snow skis, snowboards, surfboards, small water craft such as canoes and kayaks and associated accessories including oars, paddles and the like, and such equipment is typically secured to the sport equipment rack by means of clamping assemblies.

For sports such as canoeing or kayaking, there may also be a need to transport a selection or variety of paddles, depending upon the intended use of the watercraft, e.g., for negotiating a relatively calm stretch of water, such as a lake, or surviving the challenges of white water rapids. The need to carry an array of paddles can increase the number of clamping accessories that may be needed. Rack structures that support canoes, kayaks and related components are available from an array of sources and available devices typically have clamping assemblies for securing one or more elongate objects to the load bars of the roof rack. While such clamping assemblies are generally sufficient for transporting paddles, oars and the like, these known assemblies generally do not prevent theft of such equipment. Because improvements in design and selection of materials used for canoe and kayak paddles have caused these types sporting accessories to become increasingly expensive and prone to theft, it is desirable to provide a sports equipment rack that securely retains these types of objects while, at the same time, deterring theft.

While locking shackles are currently available to prevent of minimize theft of elongate objects such as canoe and kayak oars and paddles, masts, fishing rods and the like, many of the known locking shackles do not prevent theft; it is still possible to remove both the shackle together with the equipment from a load bar.

Another problem with known clamping devices and shackles is that they typically comprise hard surfaces that have a tendency to damage equipment during transport, e.g., as may occur as the result of vibration; such damage can include marring or scratching of equipment surfaces, which can compromise the integrity of equipment or performance. Because paddles oars and the like can be expensive, it also is desirable to prevent such damage.

In view of the above-described deficiencies associated with the known clamping devices and securing assemblies, there is a longfelt need to provide an apparatus for a vehicle load carrier that engages an elongate object to secure it to a vehicle load carrier while simultaneously deterring theft of the object and apparatus and preventing and/or minimizing damage to the equipment during transport.

SUMMARY OF THE INVENTION

The present invention broadly comprises an apparatus for a securing an object to a vehicle load carrier. The apparatus generally includes a gripping assembly for securing an object to the apparatus, a mounting assembly for mounting the apparatus to the load carrier, and a locking assembly. In one aspect, the locking assembly is movable between at least first and second positions. In a first position the gripping assembly and the mounting assembly are substantially prevented from free movement such that the gripping assembly may lockably secure an object to the apparatus and the apparatus may be lockably secured to the load carrier. In a second position the gripping assembly and the mounting assembly are freely movable such that objects may be loaded or unloaded from the apparatus and/or the apparatus removed from the load carrier.

One preferred aspect of the apparatus is the inclusion of an article retainer for securing one or more elongate objects, such as a mast or a paddle for a canoe or a kayak and the like, to a vehicle-top load carrier used for transporting the objects to areas suitable for water sports activities. As described herein, the present invention alleviates the drawbacks described above with respect to conventional retaining devices attached to vehicle load carriers.

An article retainer, according to the present invention, is a fully lockable, multipurpose holder for paddles, masts, oars and other elongate articles, often of the accessory-type to other sports equipment. One or more of the retainers may be attached to a vehicle carried load bar or other support structure, including a member or component of an installed or integral sports equipment rack, for securing elongate items usually having cross-sectional dimensions significantly less than their lengths; and exemplarily, 10 cm (4 inches) in diameter. The use of multiple retainers provides transport and theft protection for multiple paddles. Furthermore, more than one retainer, for instance one on each of two spaced apart load bars, may be used for securing one longer item at two a plurality of locations, such as in the case of vehicular transport of long oars or paddles.

In some aspects, each retainer includes a flexible member, e.g., a cable, restraining a portion of an elongate object along the length thereof. Based on the disclosed configuration, a one-key system can be used to operate one or more locking cylinders such that theft of items secured to the load carrier is able to be prevented or deterred. A rubber sheath acting as a buffer cushion can surround the contact surface of the cable to protect the surface finish of retained objects and prevent damage. Extra cable can neatly fit into a cable management slot formed in the surface of each retainer.

An apparatus configured according to the present invention provides means for holding elongate objects proximate a load bar. For example, the apparatus may be used to hold a canoe paddle by a portion of the paddle shaft so that the paddle's handle extends from the apparatus substantially at right angles with respect to the load bar. Retention of the shaft proximate to the load bar requires that the apparatus include a retainer attached to the load bar by means of a bracket connected to the retainer by a connection means. One connection means uses a connecting bolt that is inserted through a throughbore at an end of the bracket and passed through an orifice at one side of the retainer so that the connecting bolt protrudes sufficiently from the orifice to receive a threaded connecting knob that may be advanced along the connecting bolt by rotation of the knob. A fully installed retainer grips one side of a load bar, of a sports equipment rack, following connection of the retainer to opposite ends of a bracket, on the other side of the load bar, using a connecting bolt and a connecting knob as the means for each connection. Connection of a retainer to a bracket may include the use of a retractable latch providing the benefit of safety and security because a latched connecting knob prevents removal of the apparatus once it is firmly attached to the load bar of a sports equipment rack. Thereafter, removal of the apparatus from the load bar requires knowledge of how to release one or more retractable latches to allow reverse rotation and loosening of a connecting knob.

After attachment to the load bar, a retainer is ready to receive and secure an elongate object, such as the shaft of a canoe paddle. A retainer according to the present invention captures and retains an elongate object between a shaft saddle and a gripper cable. Application of tension to the gripper cable increases a retaining or securing pressure of the cable arrangement against the shaft. A flexible pad threaded on, or otherwise attached to the gripper cable acts as a buffer and protects the shaft from damage as the tension on the cable increases. A liner of flexible padding material may also be applied to the shaft saddle to provide further protective cushioning of the shaft. The gripper cable passes through a spring clip, or lever assembly, that includes a serrated surface to restrict retraction of the tightened gripper cable in a ratchet or unidirectional manner. In the exemplary embodiment, a spring clip includes a locking mechanism so that the gripping cable remains under tension, preventing removal of the paddle shaft and a potentially expensive article, until the spring clip is intentionally released.

The flexible pad or buffer is preferably capable of substantial deformation under the pressure of a operator constricted cable thereby tending to envelop at least a portion of the secured article, ultimately over an area greater than initially contacted when the buffer pad is initially engaged upon the article. This capability for collapse is exemplarily achieved by constructing the buffer pad as a hollowed body made out of resilient material, such as flexible rubber. Alternatively, the pad can be made of foam or similarly compressible material. By these examples, it can be appreciated that the buffer pad this resilient under, and naturally biased against imposed compressive deformation, and therefore can act as a take-up mechanism should the cable unintentionally slightly retract in the otherwise intended one-way gripping mechanism.

An apparatus configured according to one aspect of the invention provides dual locking of expensive water sports accessories to a load carrier for transportation on a vehicle. The apparatus includes a retainer that houses at least two locking mechanisms as theft prevention devices. These locking mechanisms provide a benefit and distinguishing feature of the present invention compared to existing types of apparatus for securement of elongate articles.

More particularly, the present invention provides an arrangement including a dual locking mechanism. The arrangement comprises (includes, but is not necessarily limited to) a lever having a gripping surface on the lever that has pivoting movement between a first position and a second position. A first locking mechanism includes a gripper cable contacting the gripping surface of the lever to prevent movement of the gripper cable when the lever is in the first position. Release of the gripper cable for movement occurs when the lever is in the second position. A second locking mechanism couples the lever to at least one latch that has an extended position and a retracted position. The latch prevents rotation of a connecting knob when the lever is in the first position and the latch is in the extended position. The connecting knob is free to rotate with the lever in the second position and the latch in the retracted position. A lock included in the arrangement has a locked position to confine the lever to the first position. The lock further has a release position permitting movement of the lever from the first position to the second position.

The present invention uses an apparatus to secure an elongate object to the load bar of a load carrier. The apparatus comprises a bracket having at least one throughbore formed at each opposing end thereof. A retainer includes a base and opposing side flanges each having an orifice formed therein to align with the at least one throughbore at opposing ends of the bracket. The apparatus includes a connecting bolt including a threaded portion received in the at least one throughbore of the opposing ends and the orifice of each opposing side flange when the load bar lies between the bracket and the retainer. A connecting knob includes a threaded channel to receive the threaded portion of the connecting bolt. The connecting knob further includes a plurality of spaced-apart projections as assists for turning the connecting knob to draw the threaded portion into the threaded channel to join the bracket to the retainer to provide the apparatus securely attached to the load bar.

A lever extends from the base of the retainer to pivot between a first position and a second position. The lever has a gripping surface. A first locking mechanism includes a gripper cable for wrapping around the elongate object. The gripper cable contacts the gripping surface of the lever to prevent movement of the gripper cable placed under tension to restrain the elongate object against the retainer when the lever is in the first position. Release of the gripper cable for movement occurs when the lever is in the second position.

A second locking mechanism couples the lever to at least one latch that has an extended position and a retracted position in at least one of the opposing side flanges. The latch prevents rotation of the connecting knob about the connecting bolt to prevent removal of the apparatus from the load bar when the lever is in the first position and the latch is in the extended position. The connecting knob is free to rotate with the lever in the second position and the latch in the retracted position. The apparatus includes a lock having a locked position to confine the lever to the first position preventing gripper cable movement and connecting knob rotation. The lock further has a release position permitting movement of the lever from the first position to the second position to facilitate release of the elongate object from the retainer and the apparatus from the load bar.

A method for locking an elongate object to the load bar of a load carrier comprises providing a bracket having at least one throughbore formed at each opposing end thereof and providing a retainer including a base and opposing side flanges each having an orifice formed therein to align with the at least one throughbore at opposing ends of the bracket. Insertion of a connecting bolt, including a threaded portion, into the at least one throughbore of the opposing ends and the orifice of each opposing side flange, when the load bar lies between the bracket and the retainer, places the bolt for positioning of a connecting knob including a threaded channel to receive the threaded portion of the connecting bolt. The connecting knob further includes a plurality of spaced-apart projections as assists for turning the connecting knob to draw the threaded portion into the threaded channel to join the bracket to the retainer to provide an apparatus securely attached to the load bar.

Adjustment of a lever, that has a gripping surface and pivots between a first position and a second position, controls a first locking mechanism including a gripper cable for wrapping around the elongate object. The gripper cable contacts the gripping surface of the lever to prevent movement of the gripper cable placed under tension to restrain the elongate object against the retainer when the lever is in the first position. Release of the gripper cable occurs, for movement thereof, when the lever is in the second position. The lever further controls a second locking mechanism, coupling the lever to at least one latch that has an extended position and a retracted position in at least one of the opposing side flanges. The latch prevents rotation of the connecting knob about the connecting bolt to prevent removal of the apparatus from the load bar when the lever is in the first position and the latch is in the extended position. The connecting knob has freedom to rotate with the lever in the second position and the latch in the retracted position. Locking the lever in the first position prevents gripper cable movement and connecting knob rotation to lock the elongate object to the retainer and the apparatus to the load bar.

BRIEF DESCRIPTION OF THE DRAWINGS

The invention will now be described in greater detail in the following, by way of example only, and with reference to the attached drawings, in which.

DETAILED DESCRIPTION OF THE INVENTION

As required, detailed embodiments of the present invention are disclosed herein; however, it is to be understood that the disclosed embodiments are merely exemplary of the invention that may be embodied in various and alternative forms. The figures are not necessarily to scale, and some features may be exaggerated or minimized to show details of particular components. Therefore, specific structural and functional details disclosed herein are not to be interpreted as limiting, but merely as a basis for the claims and as a representative basis for teaching one skilled in the art to variously employ the presently described invention(s).

Figure 1:
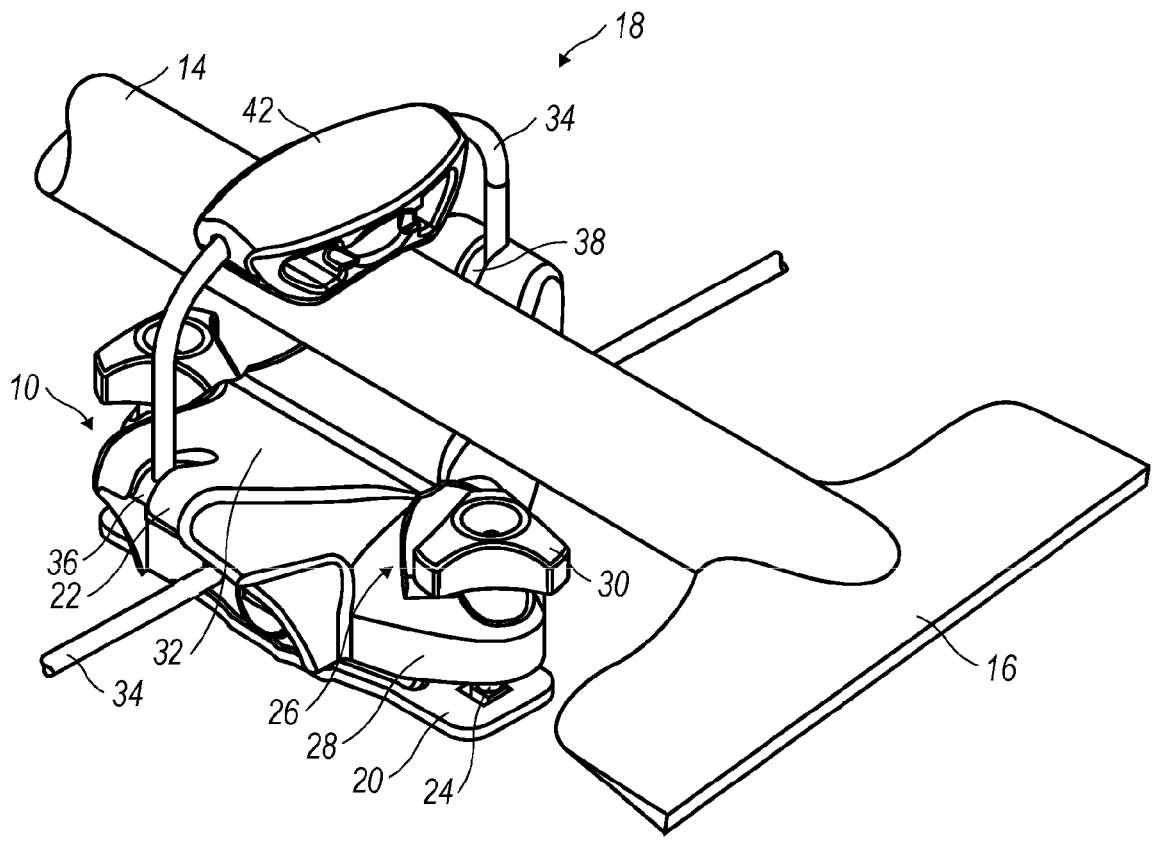
FIG. 1 is a perspective view illustrating a portion of a handle of a canoe paddle disposed between a base portion and a gripping portion of a retainer according to the present invention.

Referring to the figures, wherein like reference numbers identify like parts throughout the several views, FIG. 1 provides a perspective view showing an apparatus 10 configured according to the present invention attached to a load bar (not shown) of a load carrier (not shown) and which is also referred to herein as a sports equipment rack that may be attached to the roof of a carrier vehicle, for example. Apparatus 10 provides means for holding elongate objects adjacent to the load bar. FIG. 1 illustrates the use of apparatus 10 according to the present invention to hold a canoe paddle by a portion of paddle shaft 14 so that handle 16 extends from apparatus 10 substantially at right angles to the load bar.

Retention of shaft 14 adjacent to the load bar requires that apparatus 10 include retainer 18 attached to the load bar using bracket 20 positioned on the side of the load bar opposite retainer 18. Connection of bracket 20 to base 22 of retainer 18 may use a variety of connection means to provide apparatus 10 according to the present invention attached to a load bar. A preferred connection means for securely gripping a load bar between bracket 20 and base 22 of retainer 18 uses connecting bolt 24 inserted through a throughbore (not shown) at an end of bracket 20 to pass through an orifice (not shown) at one side of base 22 so that connecting bolt 24 protrudes sufficiently from the orifice to receive threaded connecting knob 26 that may be advanced along connecting bolt 24 by rotation of knob 26 to draw the screw portion of connecting bolt 24 into the threaded channel (not shown) of connecting knob 26. A fully installed retainer 18 grips a load bar following connection of base 22 to opposite ends of bracket 20 using connecting bolt 24 and connecting knob 26 as the means for each connection.

Apparatus 10 according to the present invention comprises retainer 18, on one side of a load bar, joined to bracket 20, on the opposite side of the load bar, using connecting means adapted for tightening so that apparatus 10 exerts a gripping force applied to both sides of the load bar. FIG. 1 illustrates connecting means, applied at each end of bracket 20. The connecting means includes connecting bolt 24 extending through one end of bracket 20 and through side flange 28 of base 22 of retainer 18. The upwardly extending connecting bolt 24 lies in a position for application of connecting knob 26 that includes a threaded channel to receive a screw portion of connecting bolt 24. Rotation of connecting knob 26 draws connecting bolt 24 into the threaded channel to provide a tight connection between base 22 and bracket 20.

The crown portion of connecting knob 26 includes several spaced apart projections 30 that provide convenient gripping segments for firmly tightening connecting knob 26 to connecting bolt 24. As connecting knob 26 advances along the screw portion of connecting bolt 24 projections 30 impinge against a retractable latch (not shown) that protrudes from side flange 28 and interferes with further rotation of connecting knob 26. To complete the process of tightening connecting knob 26 the latch may be retracted into a seat it occupies in side flange 28 of retainer 18. After tightening connecting knob 26 and releasing the retractable latch from its seat, it is no longer possible to loosen connecting knob 26 since the latch prevents reverse rotation of projections 30.

A retractable latch feature incorporated in retainer 18 according to the present invention provides a benefit of safety and security because a latched connecting knob 26 prevents removal of the elongate object retaining apparatus 10 once it is firmly attached to the load bar of a sports equipment rack. Thereafter, removal of apparatus 10 from the load bar requires knowledge of how to release one or more retractable latches to allow reverse rotation and loosening of connecting knob 26.

After attaching it to the load bar retainer 18 is ready to receive and secure an elongate object, such as shaft 14 of a canoe paddle. Retainer 18 according to the present invention captures and retains an elongate object between shaft saddle 32 and gripper cable 34. Gripper cable 34 extends from anchor point 36 to wrap around an elongate object, e.g. paddle shaft 14, resting against shaft saddle 32, then passes through guide slot 38 and spring clip 40 (see FIG. 3) before emerging from a gap (not shown) in base 22 adjacent to anchor point 36. Application of tension to the emerging gripper cable draws cable 34 through guide slot 38 and spring clip 40 (not shown in FIG. 1) to increase the pressure of the wrapped cable against shaft 14. Flexible pad 42 threaded onto gripper cable 34 protects shaft 14 from damage as the tension on cable 34 increases. A liner of flexible padding material may also be applied to shaft saddle 32 to provide further protective cushioning of shaft 14.

The portion of spring clip 40 in contact with the tensioned cable includes serrations that slightly penetrate the surface of cable 34. Although allowing further tensioning of gripper cable 34, by pulling away from spring clip 40, the serrations restrict retraction of gripper cable 34 into base 22 of retainer 18. Spring clip 40 according to the present invention includes a locking mechanism so that gripper cable 34 remains under tension, preventing removal of paddle shaft 14 and an expensive paddle, until spring clip 40 is intentionally released.

The previous description indicates that apparatus 10 according to the present invention, used to retain elongate objects such as masts, oars, paddles and the like, includes a dual locking mechanism. A first locking mechanism deters removal of apparatus 10 from the load bar of a sports equipment rack. Another locking mechanism prevents removal of an elongate object placed in shaft saddle 32 of retainer 18 and held wrapped, under tension, using gripper cable 34. Preferably both locking mechanisms may be controlled using a single keyed lock, a cylinder lock, for example, that activates both mechanisms.

Figure 2:
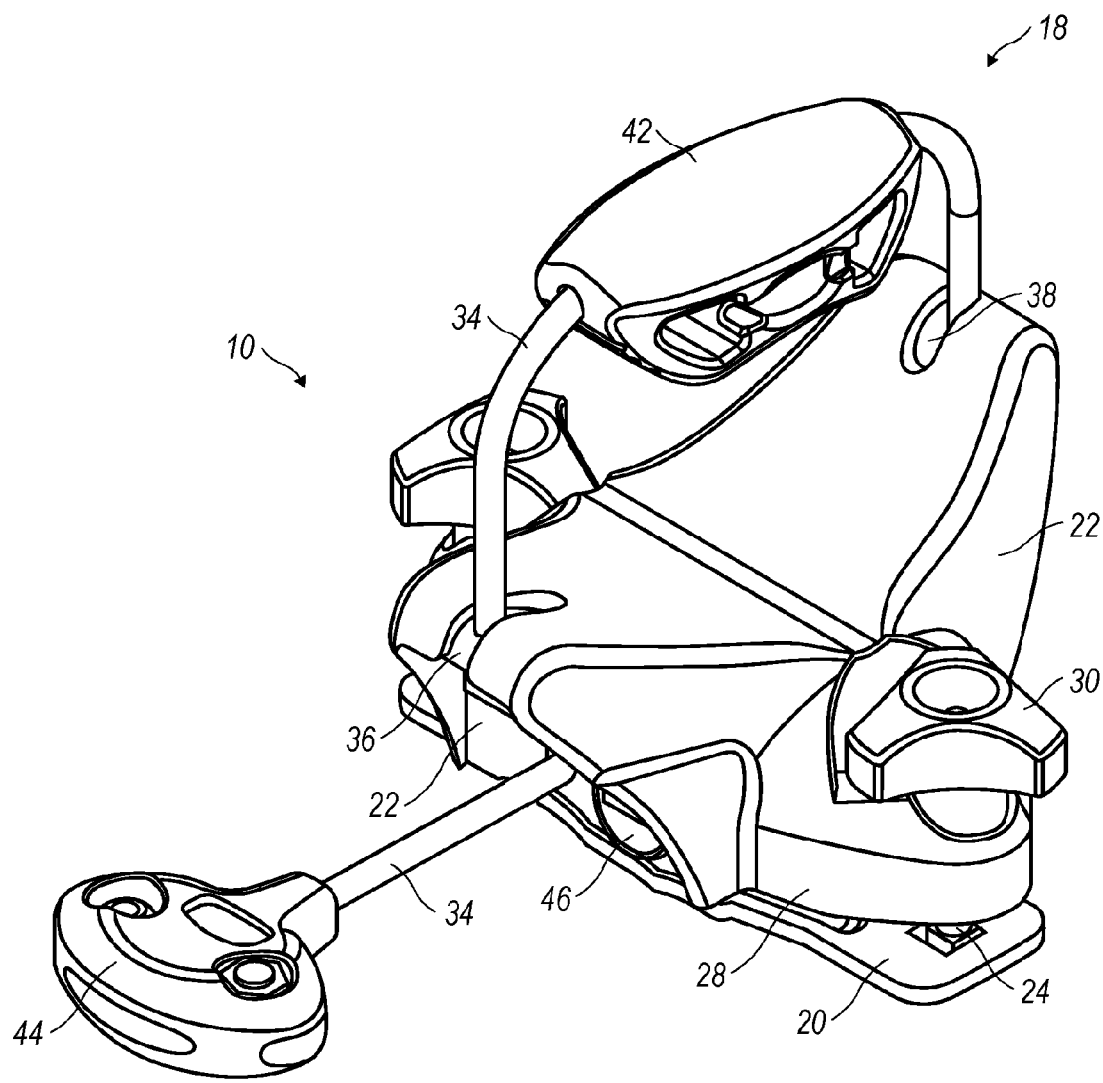
FIG. 2 is a perspective view of a lockable retainer configured according to the present invention.

FIG. 2 provides a perspective view of a lockable retainer according to the present invention before attachment to the load bar of a load carrier and attachment of a canoe paddle by shaft 14 using gripper cable 34. The illustration of FIG. 2 clearly shows many of the useful features of apparatus 10, which includes bracket 20 attached to flanges 28 on either side of base 22 using connecting means including connecting bolt 24 received in the threaded channel of connecting knob 26. Rotation of the connecting knob draws connecting bolt 24 further into the threaded channel, which reduces the gap between bracket 20 and base 22, as required for attachment of apparatus 10 to the load bar of a load carrier. The use of spaced apart projections 30 on the crown portion of connecting knob 26 provides convenient gripping segments that provide appropriate leverage for developing tight attachment of apparatus 10 to a load bar.

After attaching apparatus 10 according to the present invention to a load bar, retainer 18 provides a molded surface, referred to herein as shaft saddle 32 upon which shaft 14 of an elongate object, e.g. a paddle, rests during transportation. Shaft 14 of a paddle, for example, may be tied to shaft saddle 32 using gripper cable 34 anchored at anchor point 36 in base 22 then wrapped around retainer 18 using guide slot 38 that feeds cable 34 towards pivoting spring clip 40 through which it emerges from base 22 to be terminated using cable grip 44 that prevents gripper cable 34 from retracting back into the body of base 22. Spring clip 40 includes a lever that has a frictional or gripping surface that includes materials or surface features, such as serrations or bumps, to grip cable 34 as it passes through spring clip 40 to limit movement of gripper cable 34 after it has been wrapped and tightened around shaft 14 of an elongate object. Confinement of gripper cable 34 within spring clip 40 may be maintained using lock 46 shown in FIG. 2 as a cylinder lock that operates using a key to set lock 46 between its locked and released positions. In its locked position, lock 46 urges spring clip 40 against gripper cable 34 substantially preventing movement of cable 34. Using a key to unlock cylinder lock 46 clears spring clip 40 so that the lever may then pivot to free gripper cable 34 so as to loosen the wrap of cable 34 holding shaft 14 to shaft saddle 32. Cushion pad 42 may be threaded on gripper cable 34 to reduce the possibility of damage to the surface and finish of shaft 14 of an expensive elongate object such as a valuable canoe paddle.

Figure 3:
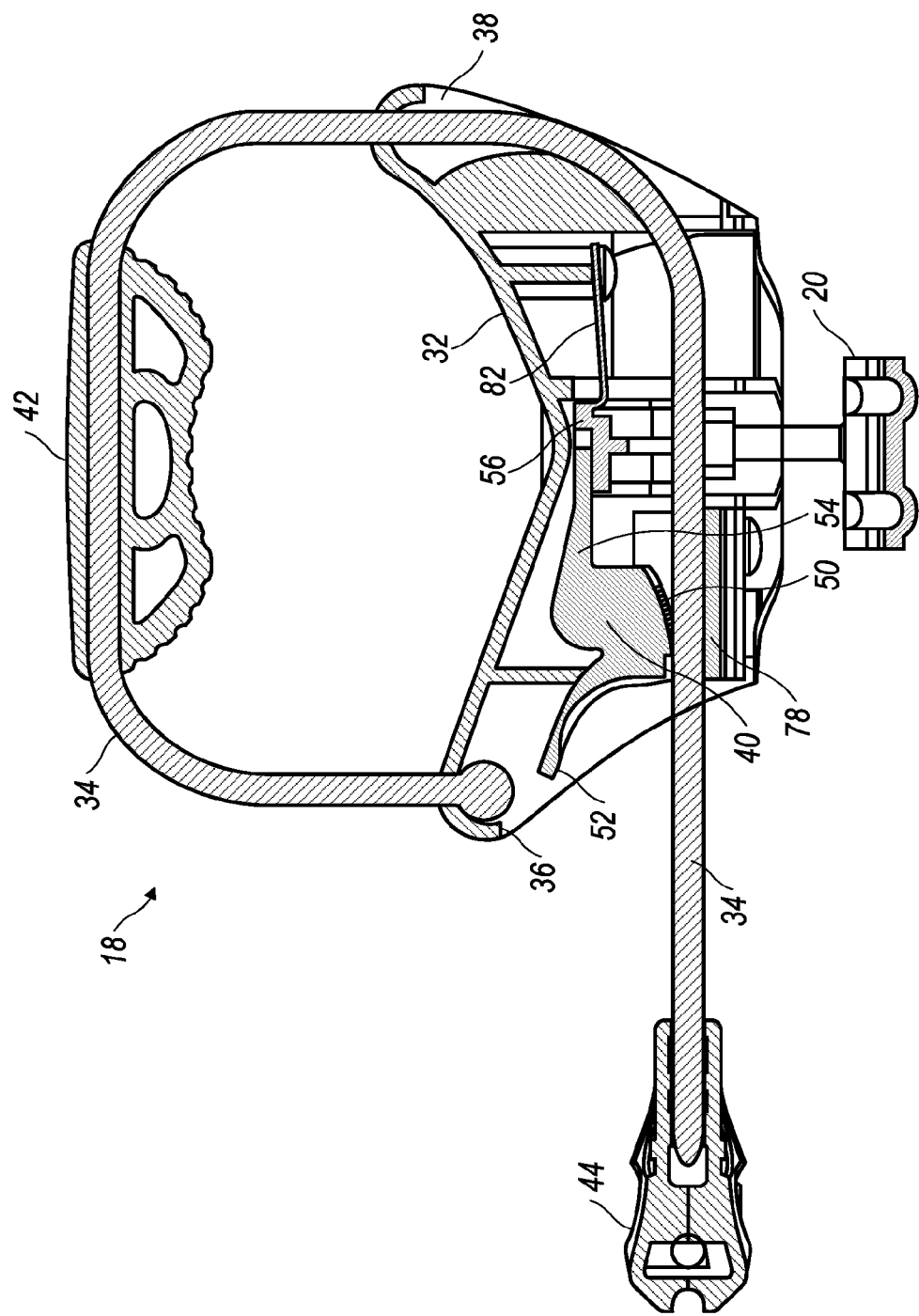
FIG. 3 is a cross section of an apparatus according to the present invention and which corresponds to a section through an approximate center of the retainer of FIG. 2 at cable 34.

FIG. 3, provides a cross section of retainer 18 according to the present invention illustrating the routing of gripper cable 34 from anchoring point 36, via guide slot 38, past gripping surface 50 of spring clip 40 that includes lever 52 for separating gripping surface 50 from gripper cable 34. Opposite lever 52 spring clip 40 includes arm 54 abutting the surface of beam 56 coupled to plate 58 (see FIG. 4) that includes at least one recess 60 (see FIG. 4) that accommodates a retractable latch (see FIG. 4). As discussed previously, the latch may be used to prevent rotation of connecting knob 26 used to attach apparatus 10 according to the present invention to the load bar of a load carrier. Retention of an elongate object using retainer 18 of FIG. 3 occurs by inserting the elongate object between shaft saddle 32 and flexible pad 42 then pulling cable 34 through spring clip 40, using cable grip 44, until there is resistance to further pulling force with flexible pad 42 tightened against the elongate object. When full tension is applied to gripper cable 34, gripping surface 50 impinging against cable 34 prevents retraction of cable 34 into the body of retainer 18.

Figure 4:
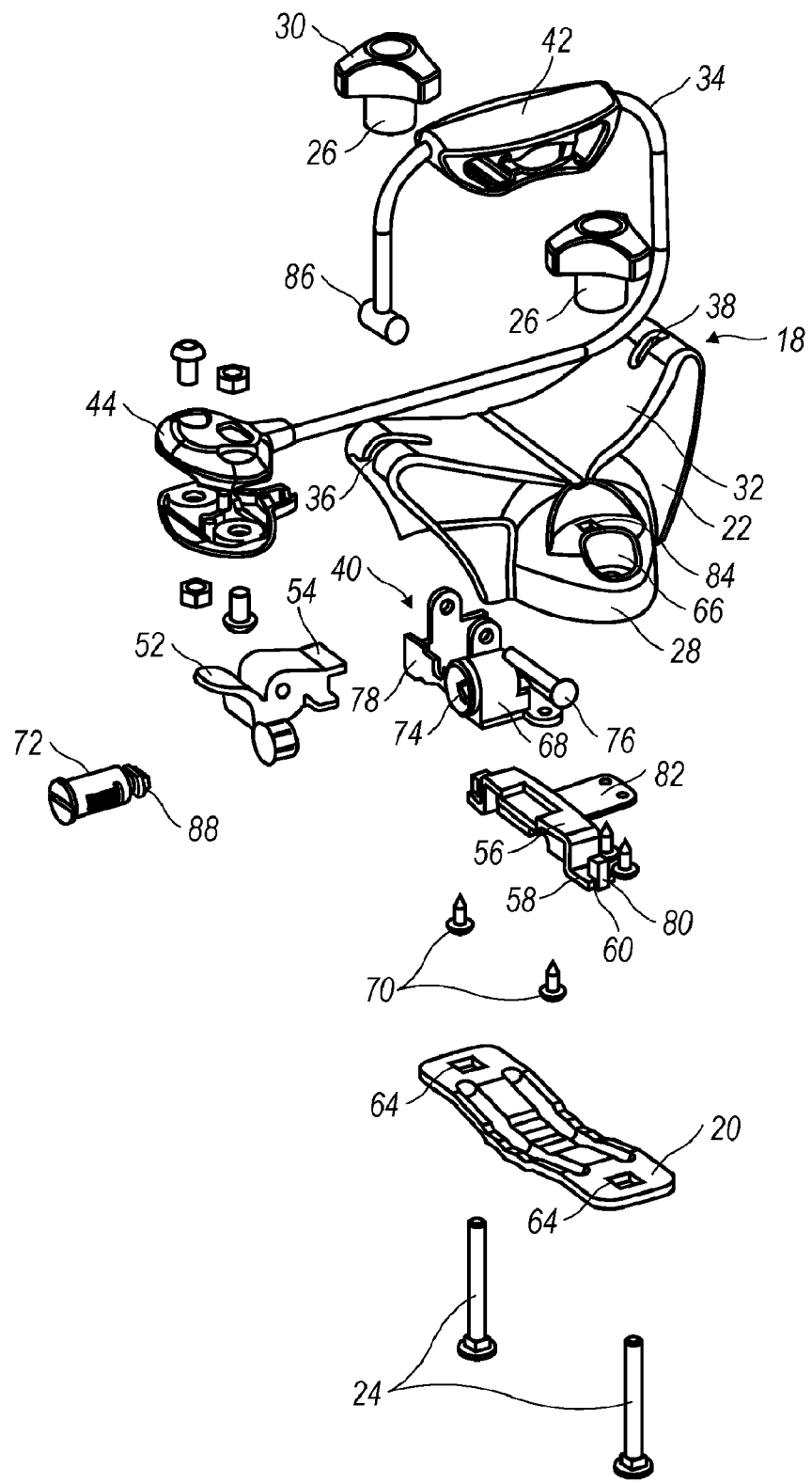
FIG. 4 is an exploded perspective view showing component parts of an apparatus for retaining elongate objects configured according to the present invention.

FIG. 4 is an exploded perspective view showing component parts of apparatus 10 for retaining elongate objects according to the present invention. Apparatus 10 comprises bracket 20 and retainer 18 that may be joined together to attach apparatus 10 to a load bar. A preferred connection means, for attaching apparatus 10 to the load bar uses connecting bolts 24 inserted through throughbores 64 at each end of bracket 20. Each connecting bolt 24 passes through an orifice 66 formed in side flange 28 of retainer 18. Preferably, retainer 18 includes two side flanges 28. Connecting bolt 24, inserted through orifice 66 of side flange 28, protrudes sufficiently from orifice 66 to receive threaded connecting knob 26 that may be advanced along connecting bolt 24 by rotation of knob 26. A fully installed retainer 18 grips a load bar of a sports equipment rack, following connection of retainer 18 to opposite ends of bracket 20 using connecting bolt 24 and connecting knob 26 as the means for each connection.

Base 22 of retainer 18 contains several components providing benefits to the present invention. One component is housing 68 secured to base 22 using a pair of screws 70. Cylinder lock 72 fits into cylindrical opening 74 in housing 68, which also provides part of spring clip 40 that includes lever 52 connected by pin 76 to pivot within keeper 78. A spring (not shown) between keeper 78 and lever 52 urges lever 52 towards keeper 78. Lever 52 and keeper 78 may be separated by applying pressure to raise lever 52 relative to keeper 78.

Figure 5:
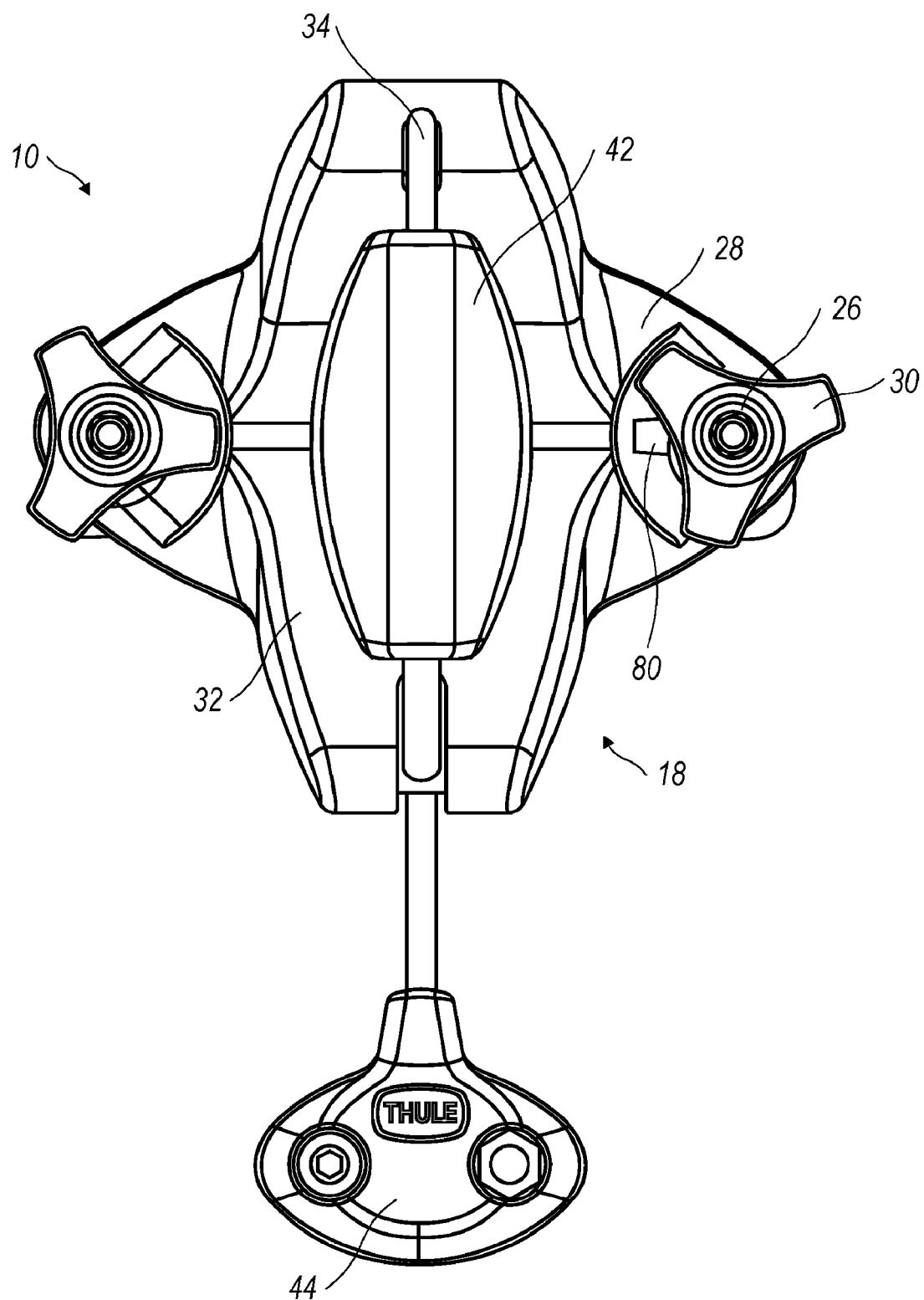
FIG. 5 is a top, plan view of an apparatus exemplarily of the present invention.

Pivoting lever 52 includes arm 54 that abuts beam 56 coupled to plate 58 that includes at least one recess 60 (see FIG. 4) that accommodates a retractable latch, or interference member, 80. Connecting tongue 82 extending from beam 56 provides means for attaching beam 56 inside base 22 of retainer 18 (see FIG. 3). Latch 80 is the retractable latch discussed previously, which prevents rotation of connecting knob 26 used to attach apparatus 10 according to the present invention to the load bar of a load carrier. In its normal position, latch 80 protrudes from latch seat 84, of side flange 28 to interfere with rotation of connecting knob 26 threaded onto connecting bolt 24. Application of pressure to raise lever 52 above keeper 78 causes arm 54 to pivot downwards to depress beam 56 and retract latch 80, which withdraws into latch seat 84. Unlatching latch 80 removes the impediment to rotation of connecting knob 26 thereby allowing retainer 18 to be released from the load bar. FIG. 5, provides a plan view looking down on apparatus 10 according to the present invention to clarify the relative positioning of latch 80 and projections 30 of connecting knob 26 so that latch 80, when extended, restricts rotation of connecting knob 26 about connecting bolt 24.

Referring to FIGS. 3 and 4, the routing of gripper cable 34 proceeds from anchoring point 36 where it is hooked using cable slug 86 before wrapping gripper cable 34 around retainer 18, through guide slot 38 and base 22. Inside base 22, the gripping, preferably serrated, surface 50 of spring clip 40 holds gripper cable 34 against keeper 78 restricting forward and reverse movement of cable 34 until upward pressure on lever 52 produces sufficient separation of gripping surface 50 from keeper 78 to release gripping cable 34. If lock 72 has been activated, locking catch 88 limits lever 52 to its closed position. In this position locking catch 88 prevents the raising of lever 52 sufficiently to release gripper cable 34. The locked cable feature described here for apparatus 10 according to the present invention combined with the use of retractable latch 80 to lock the apparatus to the load bar of a sports equipment rack, provides the theft preventing, dual locking mechanism that may be controlled using a single lock, preferably a cylinder lock operable with a single key. A dual locking device, as described herein, distinguishes the present invention from existing types of apparatus for transporting elongate articles.

An apparatus, including a bracket and a retainer according to the present invention for securing elongate articles, such as boat masts and paddles for canoes and kayaks, to a load carrier of a transporting vehicle and related components have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

What is claimed is:

1. An apparatus for securing an object to a vehicle load carrier, said apparatus comprising:
    a gripping assembly for lockably securing said object to said apparatus;
    a mounting assembly for lockably mounting said apparatus to said load carrier; and
    a locking assembly, said locking assembly movable between at least first and second positions, wherein in a first position said gripping assembly and said mounting assembly are substantially prevented from free movement and wherein in a second position said gripping assembly and said mounting assembly are freely movable and wherein said gripping assembly comprises a lever having a gripping surface, said lever pivoting between a first position and a second position;
    said gripping assembly including a gripper cable contacting said gripping surface of said lever to prevent movement of said gripper cable when said lever is in said first position, said gripper cable released for movement thereof when the lever is in the second position;
    said lever coupled to at least one latch of said mounting assembly, said latch movable between an extended position and a retracted position, said latch preventing rotation of a connecting knob when said lever is in said first position and said latch is in said extended position, said connecting knob free to rotate when said lever is in said second position and said latch is in said retracted position; and
    said locking assembly having a locked position to confine said lever to said first position, said locking assembly further having a release position, permitting movement of said lever from the first position to the second position.

2. An apparatus for securing an elongate object to a load bar of a load carrier, said apparatus comprising:
    a bracket having at least one throughbore formed at each opposing end thereof,
    a retainer including a base and opposing side flanges, each said side flange having an orifice formed therein to align with said at least one throughbore at opposing ends of said bracket;
    a connecting fastener received in said at least one throughbore of the opposing ends and said orifice of each opposing side flange when said load bar lies between said bracket and said retainer;
    a connecting knob receiving said connecting fastener, said connecting knob further including a plurality of spaced-apart projections a lever extending from said base of said retainer and pivoting between a first position and a second position, said lever having a gripping surface;
    a first locking mechanism including a gripper cable for wrapping around said elongate object, said gripper cable contacting said gripping surface of said lever to prevent movement of said gripper cable placed under tension to restrain said elongate object against said retainer when said lever is in said first position, said gripper cable released for movement thereof when said lever is in the second position;
    a second locking mechanism coupled to said lever, said second locking mechanism comprising at least one latch movable between an extended position and a retracted position in at least one of the opposing side flanges, said latch preventing rotation of said connecting knob about said connecting fastener to prevent removal of said retainer from said load bar when said lever is in said first position and said latch is in said extended position, said connecting knob free to rotate with said lever in said second position and said latch in said retracted position; and
    a lock having a locked position to confine said lever to said first position preventing gripper cable movement and connecting knob rotation, said lock further having a release position permitting movement of said lever from said first position to said second position to facilitate release of said elongate object from said retainer and said retainer from said load bar.

3. A method used to lock an elongate object to a load bar of a load carrier, the method comprising:

providing a bracket having at least one throughbore formed at each opposing end thereof, providing a retainer including a base and opposing side flanges each having an orifice formed therein to align with said at least one throughbore at opposing ends of said bracket;

inserting a connecting fastener into the at least one throughbore of said opposing ends and said orifice of each opposing side flange when said load bar lies between said bracket and said retainer;

positioning a connecting knob to receive said connecting fastener, said connecting knob further including a plurality of spaced-apart projections to joining said bracket to said retainer to provide a retainer securely attached to the load bar;

adjusting a lever that has a gripping surface and pivots between a first position and a second position to control a first locking mechanism including a gripper cable for wrapping around said elongate object, said gripper cable contacting said gripping surface of said lever to prevent movement of said gripper cable placed under tension to restrain said elongate object against said retainer when said lever is in said first position, said gripper cable released for movement thereof when said lever is in said second position, said lever further controlling a second locking mechanism, said lever coupled to at least one latch of said second locking mechanism, said at least one latch having an extended position and a retracted position in at least one of the opposing side flanges, said latch preventing rotation of said connecting knob about said connecting fastener to prevent removal of said retainer from said load bar when said lever is in said first position and said latch is in said extended position, said connecting knob free to rotate with said lever in said second position and said latch in said retracted position; and locking said lever in said first position thereby preventing gripper cable movement and connecting knob rotation to lock said elongate object to said retainer and said retainer to said load bar.

4. An apparatus for securing an elongate article to a vehicular load support, said apparatus comprising:

an article securement device including an article receiving arrangement coupled to a mounting arrangement configured for releasably mounting said article securement device to a vehicle-borne load support;

a dual-action locking mechanism configured to provide coordinated lock and release of said article receiving arrangement to a secured portion of an elongate article and said mounting arrangement to the vehicle-borne load support and thereby establishing lock and release configurations of said article securement device;

said article receiving arrangement comprising a recessed support surface adapted to restingly receive the secured portion of the elongate article and a tension mechanism having a cable tightenable about the secured portion of the elongate article;

said article receiving arrangement further comprising a resiliently compressible buffering member interposed between said article receiving arrangement and the secured portion of the elongate article, and said resiliently compressible buffering member, together with said recessed support surface, establishing a contractible surround about the portion of the elongate article to be secured therein;

said resiliently compressible buffering member contacting a greater surface area of the elongate article in a tension-imposed configuration compared to a tension-released configuration of said tightenable cable;

said dual-action locking mechanism comprising an extendible and retractable interference member concealed under, and blocking rotation of an operator actuable knob of said mounting arrangement in said lock configuration; and said serrated surface of said one-way gripping device being of one-piece construction with said extendible and retractable interference member for coordinated transition between said lock and release configurations of said article securement device.

5. An apparatus for securing an elongate article to a vehicular load support, said apparatus comprising:

an article securement device including an article receiving arrangement coupled to a mounting arrangement configured for releasably mounting said article securement device to a vehicle-borne load support;

a dual-action locking mechanism configured to provide coordinated lock and release of said article receiving arrangement to a secured portion of an elongate article and said mounting arrangement to the vehicle-borne load support and thereby establishing lock and release configurations of said article securement device;

said article receiving arrangement comprising a recessed support surface adapted to restingly receive the secured portion of the elongate article and a tension mechanism having a cable tightenable about the secured portion of the elongate article;

said article receiving arrangement further comprising a resiliently compressible buffering member interposed between said article receiving arrangement and the secured portion of the elongate article, and said resiliently compressible buffering member, together with said recessed support surface, establishing a contractible surround about the portion of the elongate article to be secured therein;

said resiliently compressible buffering member contacting a greater surface area of the elongate article in a tension-imposed configuration compared to a tension-released configuration of said tight enable cable;

said tightenable cable being sheathed in impressionable material that in cooperation with a serrated surface of a one-way gripping device holds said tightenable cable in the tension imposed configuration until said serrated surface is transitioned to the tension released configuration.

6. The apparatus as recited in claim 5, farther comprising:
said dual-action locking mechanism comprising an extendible and retractable interference member concealed under, and blocking rotation of an operator actuable knob of said mounting arrangement in said lock configuration.

7. The apparatus as recited in claim 5, farther comprising:
said resiliently compressible buffering member having an expansive bias in said tension-imposed configuration and thereby constituting a take-up device should unintended tension be relieved from said tightenable cable.

8. The apparatus as recited in claim 7, farther comprising:
said resiliently compressible buffering member having a hollow void therein providing facilitation of at least a partial collapse of said buffering member in said tension-imposed configuration compared to said tension-released configuration.

9. The apparatus as recited in claim 5, further comprising:

said dual-action locking mechanism comprising an extendible and retractable interference member concealed under, and blocking rotation of an operator actuable knob of said mounting arrangement in said lock configuration; and said serrated surface of said one-way gripping device being coupled together with said extendible and retractable interference member for coordinated transition between said lock and release configurations of said article securement device.

10. The apparatus as recited in claim 9, further comprising:

said dual-action locking mechanism comprising a single blocking member that prevents unauthorized transition of both of said one-way gripping device and said extendible and retractable interference member from said lock to said release configuration.

* * * * *